Oct. 28, 1958 L. F. DEISE 2,858,380

MAGNETIC AMPLIFIER CONTROL CIRCUIT

Filed Sept. 28, 1955

WITNESSES

Leon J. Faga

John B. Davidson

INVENTOR

Louis F. Deise

BY

Paul E. Friedemann

ATTORNEY 2,858,380
Patented Oct. 28, 1958

2,858,380

MAGNETIC AMPLIFIER CONTROL CIRCUIT

Louis F. Deise, Baltimore, Md., assignor to Westinghouse Electric Corporation, East Pittsburgh, Pa., a corporation of Pennsylvania Application September 28, 1955, Serial No. 537,189

6 Claims. (Cl. 179—171)

Figure 1:
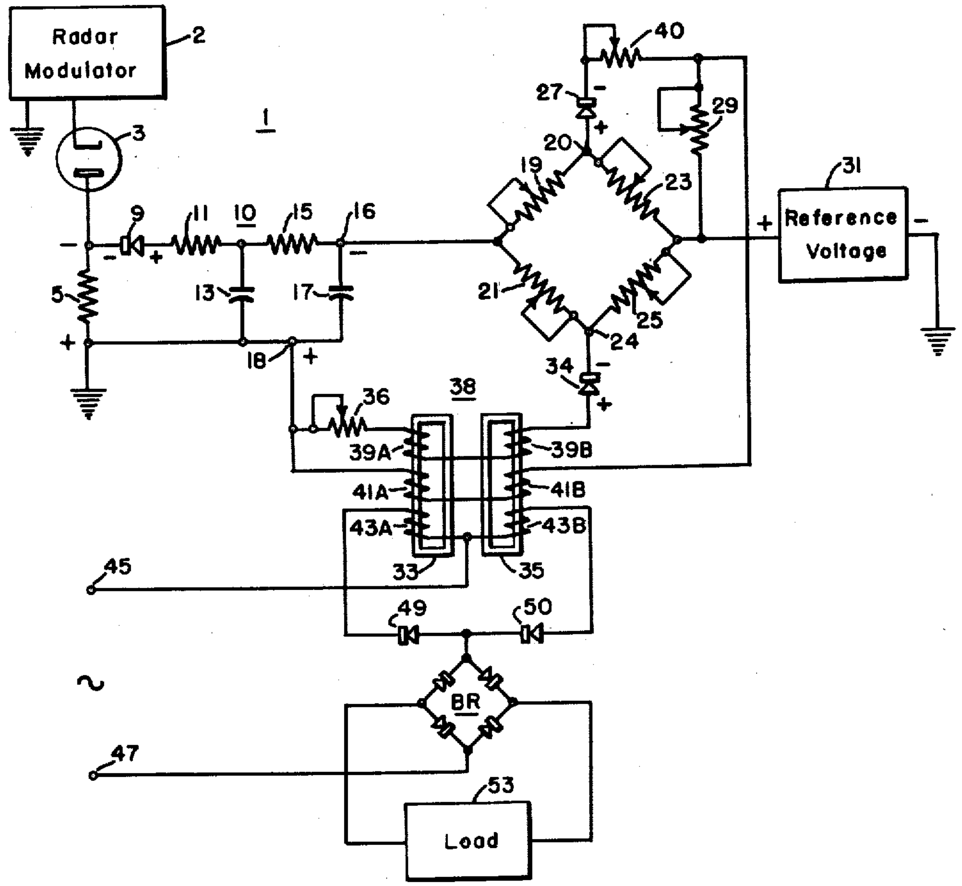

This invention relates to magnetic amplifier control systems and, more particularly, to magnetic amplifiers wherein the variation of output current as a function of input current may be controlled according to two sets of functional relationships by means of a single control signal.

In the ordinary magnetic amplifier, the variation of output current as a function of input current is fairly linear over a rather extensive portion of its control range. This is particularly true of the self-saturating type of magnetic amplifier that has found wide adoption in industrial control applications in recent years, such as is illustrated in the text "Magnetic Amplifier Circuits" by William A. Geyger (1954) at page 160. Over those portions of the control characteristic where the output current is a non-linear function of the input current, the relationship is a continuous one; i. e., the change in output current with variation of control current is a gradual one so that there is no sudden change from one functional relationship to another, such as would produce a sharp break when the control characteristic is represented by means of Cartesian coordinates.

In certain applications, it is desirable to have the magnetic amplifier exhibit a discontinuous control characteristic, such that the output current will drop off sharply for control currents below a given value while maintaining a linear but smaller rate of change for higher values of control current. An example of prior art attempts to achieve such an end may be found in U. S. Patent No. 1,921,703 to A. Schmidt, Jr., wherein the reactance of a simple variable-reactance type of magnetic amplifier is made to undergo a discontinuous change by providing a magnetic shunt for the D. C. control winding. This expedient is not well adapted for use with commercial magnetic amplifiers, particularly self-saturating amplifiers, because of manufacturing difficulties involved in making magnetic cores. This is particularly true when a magnetic core having an essentially rectangular hysteresis loop is required for proper operation of the amplifier. Solid cores rather than laminated cores are generally required for a rectangular-loop characteristic, the laminated construction being not well adapted for this purpose. Furthermore, the point of transition from one control characteristic to the other is not readily adjustable, being primarily a function of the design of the core, so that minor manufacturing errors may move the transition point away from the desired portion of the input-output characteristic of the amplifier.

It is one object of this invention to provide an electric amplifier having a discontinuity in the functional relationship between the output signal and input signal wherein the point of discontinuity may be readily controlled.

It is another object to provide a control system for a magnetic amplifier wherein a discontinuous control characteristic may be obtained utilizing component parts of the standard manufacturing design.

It is still another object to provide a control system for a self-saturating type of magnetic amplifier wherein the output current variation, as a function of control current, has an adjustable point of discontinuity.

Figure 2:
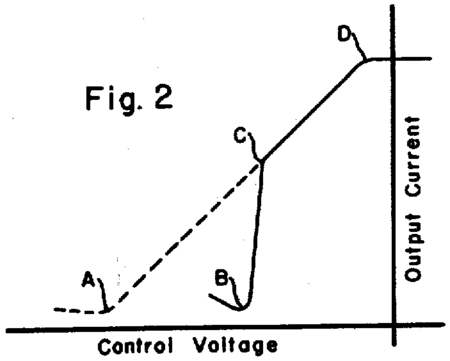

Other objects and features will become apparent upon consideration of the following detailed description of the invention when taken in conjunction with the accompanying drawings wherein:

Fig. 1 is a schematic diagram showing an embodiment of the present invention; and Fig. 2 is a characteristic curve of output current as a function of control voltage of a magnetic amplifier constructed according to the present invention, which curve is useful in understanding the operation of the invention.

According to one aspect of this invention, a source of control voltage and a reference voltage source are connected in series adding to a tapped voltage divider network, so that the voltage across the divider is equal to the sum of the output voltages of the two sources, the voltage sources having one common output terminal. The control windings of a magnetic amplifier having two control windings are coupled between the common terminal and the tap means of the voltage divider by means of the unilateral conduction devices, so that current will flow through one winding when the voltage between the tap and the common terminal is of one polarity and through the other winding when the voltage is of the other polarity. The bias of the amplifier, which determines its quiescent operating point, is set by exciting one of the windings directly from the aforementioned reference voltage source by means of a bilateral conduction device, such as a resistor. The point of discontinuity of the composite characteristic of the two control windings may be adjusted by varying the tap on the voltage divider, thus changing the magnitude of the output of the control voltage source at which there is zero voltage between the tap and the aforementioned common terminal.

With reference now to Fig. 1, there is shown a control voltage source 1 which conveniently may comprise a radar modulator 2 coupled to a filter 10 by means of a vacuum tube diode 3 and resistor 5. More specifically, diode 3 is connected to the radar modulator between the charging choke and the pulse line, which pulse line feeds a magnetron through a pulse transformer. When the magnetron misfires, it mismatches the load on the pulse line so that the voltage goes negative at the end of a pulse and diode 3 conducts. The resistor 5 is connected to the plate of the diode 3 so that current pulses produced by misfiring of the magnetron will produce a voltage across the resistor such that the plate is at negative potential with respect to ground. Filter 10, which comprises serially connected resistors 11 and 15 and shunt connected capacitors 13 and 17, is coupled across resistor 5 by means of diode 9, which diode is polarized so that the capacitors 13 and 17 may be charged by the voltage pulses appearing across resistor 5 but will not thereafter discharge through resistor 5. Thus, terminal 18 of capacitor 17 which is connected to ground, is at a positive potential with respect to terminal 16. The control voltage is derived across terminals 16, 18. Negative output terminal 16 of the control voltage source 1 is connected to the positive terminal of reference voltage source 31 by means of a bridge-type voltage divider comprising serially connected resistors 19 and 23, and serially connected resistors 21 and 25.

Magnetic amplifier 38 is of the self-saturating type described in the aforementioned text by W. A. Geyger. The magnetic amplifier comprises a pair of magnetic cores 33 and 35, preferably made of Orthonol, Deltamax or similar material exhibiting a rectangular hysteresis loop. Core 33 has wound thereon a load winding 43A, and a pair of control windings 39A and 41A, while core 35 has a similar load winding 43B and control windings 39B and 49B. Self-saturating half-wave rectifiers 49 and 50 are respectively connected to load windings 43A and 43B in the usual manner to form a series loop. A source of alternating current having terminals 45 and 47 is coupled to the magnetic amplifier through the input terminals of a bridge rectifier BR, the output terminals of the bridge rectifier being connected to a load 53. The load in the apparatus described may be a relay which will disconnect the high voltage from magnetron 2 when an excessive number of misfires occur, such as will produce an excessive number of current pulses through resistor 5. One input terminal of the bridge rectifier is connected to an alternating current source terminal 47 while the other is connected to the junction of self-saturating rectifiers 49 and 50. The other A. C. source terminal 45 is connected to the junction of load windings 43A and 43B in the usual manner.

Control windings 41A and 41B are serially connected with variable resistor 40 between control voltage terminal 18 and the juncture 20 of resistors 19 and 23 by means of a half-wave rectifier 27. Rectifier 27 may be of the dry type, such as a selenium or germanium device well known to the art. The windings 41A, 41B are wound so that with current flowing through rectifier 27 from juncture 20 to terminal 18 the flux produced thereby in cores 33 and 35 will respectively oppose the flux produced by load windings 43A, 43B when current is flowing therethrough.

Similarly, control voltage windings 39A and 39B are serially connected with variable resistor 36 and half-wave rectifier 34 between control voltage terminal 18 and the juncture 24 of resistors 21 and 25. The half-wave rectifier is polarized to permit current flow from terminal 18 to juncture 24. Windings 39A and 39B are wound so that with current flowing therethrough the flux produced in the respective cores 33 and 35 will aid the flux produced by load windings 43A and 43B when current is flowing through the load windings. The function of resistors 36 and 40 is to adjust the current flowing through the respective control windings associated therewith so as to vary the relationship between output current through windings 43A, 43B and control voltage across terminals 16, 18.

The bias for the magnetic amplifier 38 is derived from reference voltage source 31 by means of a variable resistor 29 connected between the positive terminal of source 31 and the juncture of rectifier 27 and control winding 41B. Thus, bias current flows from the positive terminal of source 31 through resistor 29, windings 41B and 41A to ground, and the negative terminal of source 31.

In operation, let it be assumed that the proper supply voltages have been applied to the apparatus described and that the magnetron is misfiring at a rate that will produce a voltage across terminals 16 and 18 equal to the reference voltage. Further, let it be assumed that resistors 19 and 23 are of equal value and that resistors 21 and 25 are of equal value so that with the output voltage of source 1 equal to the voltage of reference source 31, the voltage and junctures 20 and 24 will be at ground potential. Thus, no current will flow through rectifiers 27 and 34, and the output current from magnetic amplifier 38 will be determined solely by the bias current flowing through resistor 29 and control windings 41A and 41B. Referring to Fig. 2, the magnetic amplifier will be operating at the point on its curve depicted by C. Should the misfire rate of magnetron decrease so that the voltage appearing across terminals 16 and 18 decreases in magnitude, terminal 16 becoming less negative with respect to ground, junctures 20 and 24 will become positive with respect to ground so that current flows through rectifier 27 and control windings 41A and 41B. The output of the magnetic amplifier will thereupon follow the solid curve of Fig. 2 from point C towards point B instead of progressing along the dotted curve towards point A. Should the misfire rate increase so that the voltage across terminals 16 and 18 increases in magnitude, terminal 16 thereupon becoming more negative with respect to terminal 18, juncture 24 will become negative with respect to ground so that current flows through windings 39A, 39B and half-wave rectifier 34. Rectifier 27 blocks so that no current flows through windings 41A and 41B. Since the effect of windings 39A and 39B is to aid the load windings 43A and 43B, the average output voltage of the magnetic amplifier will increase so that the output characteristic will progress along the portion of the curve of Fig. 2 between C and D.

It will be noted that at the point that junctures 20 and 24 are at ground potential, so that zero current is flowing therethrough and through the respective control windings associated therewith, there is a very abrupt transition from the control effect of windings 39A, 39B to the control effect of windings 41A and 41B or vice versa.

Note that the transition point C, or point of discontinuity of the transfer characteristic of the magnetic amplifier, may be readily adjusted by varying resistor 29, thus moving the point of discontinuity either up or down between the points A and D. Note further that by varying the resistance of resistors 36 and 40, the slope of the respective portions of the transfer characteristic between points B and C, and points C and D, may be varied so as to obtain a transfer characteristic adjustable over wide limits.

If there is to be a single point of discontinuity as shown in Fig. 2, it is necessary that junctures 20 and 24 should be at the same potential. Under certain circumstances, it may be desirable to have a dead zone exist whereat only the current through resistor 29 determines the output of the magnetic amplifier. Under this circumstance, it is only necessary to vary the relative impedances of the resistors 19, 21, 23 and 25 so that the junctures 20 and 24 are at different operating potentials; upon variation of the output voltage of source 1 over a given range, rectifiers 27 and 34 will both block current flow through the respective control windings associated therewith.

The magnetic amplifier may be manufactured by utilizing component parts of standard manufacture, there being no components in the circuitry described above which are at all non-standard in nature. The point of discontinuity may be readily controlled over a very wide range and the slope of the transfer characteristic of the magnetic amplifier may likewise be controlled over a considerable range.

The invention is not to be restricted to the specific structural details, arrangement of parts or circuit connections herein set forth, as various modifications thereof may be effected without departing from the spirit and scope of this invention.

I claim as my invention:

1. In a magnetic amplifier including an output circuit, and first and second control winding means for varying the output current from said magnetic amplifier in accordance with the magnitude of current through said windings; a reference voltage source and a control voltage source having a common terminal; variable resistance means coupling said reference voltage source to said first control winding for supplying a bias current thereto; first and second voltage divider means individually connecting said reference voltage source and said control voltage source in series adding such that first and second taps respectively on said first and second voltage divider means are at the same potential when the output voltages of said voltage sources are equal; first half wave rectifier means coupling said first tap to said common terminal through said first control winding means so that current flows therethrough when the magnitude of the output voltage of said control voltage source is greater than the magnitude of the output voltage of said reference voltage source; second half-wave rectifier means coupling said second tap to said common terminal through said second control winding means such that current flows therethrough when said magnitude of said output voltage of said reference voltage source is greater than said magnitude of said output voltage of said control voltage source.

2. In a self-saturating type magnetic amplifier including magnetic core means, load winding means on said magnetic core means, and self-saturating rectifier means for coupling said load winding means to a load; first and second control winding means in inductive relationship with said magnetic core means; a reference voltage source and a control voltage source connected together so as to have a common terminal and a pair of output terminals and so that an output voltage is derived across said output terminals having a magnitude equal to the difference of the magnitudes of the individual output voltages of said voltage sources; first and second voltage divider means each having a tap and each being connected across said output terminals, the voltage at each of said taps being substantially equal to the voltage at said common terminal when said control voltage is equal in magnitude to said reference voltage, first half-wave rectifier means coupling said first control winding between said tap of said first voltage divider means and said common terminal to energize said first control winding with the output voltage of said control voltage source is greater in magnitude than the output voltage of said reference voltage source, second half-wave rectifier means coupling said second control winding between said tap of said second voltage divider means and said common terminal and poled to energize said second control winding when the output voltage of said reference voltage source is greater in magnitude than the output voltage of said control voltage source; and resistor means coupling said reference voltage source directly across said second control winding means to supply a constant bias current thereto.

3. In a magnetic amplifier having an output circuit, first control winding means for varying the output current from said amplifier according to a first functional relationship as a function of current through said first control winding means, and second control winding means for varying said output current according to a second functional relationship as a function of current through said second winding means; reference voltage source means; control voltage source means; said reference voltage source means and control voltage source means having a common terminal and a pair of output terminals connected so as to derive an output voltage across said output terminals having a magnitude equal to the difference of the magnitudes of the output voltages of said reference voltage source means and said control voltage source means; first and second voltage divider means having first and second taps respectively; each of said voltage divider means being connected across said output terminals; means including said first control winding means coupling said first tap to said common terminal adapted to energize said first control winding means only when said control voltage is less than said reference voltage, means including said second control winding means coupling said second tap to said common terminal adapted to energize said second control winding means when said control voltage is greater than said reference voltage.

4. In a magnetic amplifier having an output circuit, first control winding means for varying the output current from said amplifier according to a first functional relationship as a function of current through said first control winding means, and second control winding means for varying said output current according to a second functional relationship as a function of current through said second control winding means; reference voltage source means; control voltage source means; said reference voltage source means and control voltage source means being connected together to have a common terminal and a pair of output terminals and to derive an output voltage across output terminals thereof having a magnitude equal to the difference of the magnitudes of the output voltages of said reference voltage source means and said control voltage source means; first and second voltage divider means having first and second taps respectively; each of said voltage divider means being connected across said output terminals; means including said first control winding means and first unilateral impedance means coupling said first tap to said common terminal adapted to energize said first control winding means only when said control voltage is less than said reference voltage; means including said second control winding means and second unilateral impedance means coupling said second tap to said common terminal and poled to energize said second control winding means when said control voltage is greater than said reference voltage; and bilateral impedance means coupling said reference voltage source to said second control winding means.

5. In a magnetic amplifier having an output circuit, first control winding means for varying the output current from said amplifier according to a first functional relationship as a function of current through said first control winding means, and second control winding means for varying said output current according to a second functional relationship as a function of current through said second winding means; reference voltage source means; control voltage source means; said reference voltage source means and control voltage source means being connected together so as to have a common terminal and a pair of output terminals, and to derive an output voltage across said output terminals having a magnitude equal to the sum of the magnitudes of the output voltages of said reference voltage source means and said control voltage source means; thereafter first and second voltage divider means having first and second taps respectively; each of said voltage divider means being connected across said output terminals; means including said first control winding means and first unilateral impedance means coupling said first tap to said common terminal adapted to energize said first control winding means when said control voltage is less than said reference voltage; means including said second control winding means and second unilateral impedance means coupling said second tap to said common terminal adapted to energize said second control winding means when said control voltage is greater than said reference voltage; bilateral impedance means coupling said reference voltage source to said second control winding means; said control voltage source comprising a pulse source, resistor means serially coupled to said pulse source to derive voltage pulses thereacross indicative of the magnitude thereof, capacitive filter means adapted to average the magnitude of said pulses and unilateral impedance means for coupling said pulses to said filter means and for preventing discharge of said filter means through said resistor means, the output of said source being taken across the output of said filter means.

6. In a magnetic amplifier having an output circuit, first control winding means for varying the output current from said amplifier according to a first functional relationship as a function of current through said first winding means, and second control winding means for varying said output current according to a second functional relationship as a function of current through said second winding means; reference voltage source means; control voltage source means; said reference voltage source means and control voltage source means being connected together to have a common terminal, an output terminal for each of said reference and control voltage source means, impedance means, said output terminals for said reference and control voltage source means being connected to said impedance means at different points, first unidirectional means connecting said second control voltage winding means to said impedance means at still a different point, a second unidirectional means connecting said first control winding means to still another point on said impedance means, bias tap means connecting said reference output terminal to said second control voltage winding means, said first and second unidirectional means being poled to allow current flow through said first control voltage winding means only when said control voltage source is greater than said reference voltage source means and to allow current flow through said second control voltage winding means only when said control voltage source means is smaller than said reference voltage source means.

References Cited in the file of this patent

UNITED STATES PATENTS

| | | |
|---|---|---|
| 2,629,847 | Eames et al. | Feb. 24, 1953 |
| 2,632,145 | Sikorra | Mar. 17, 1953 |
| 2,677,099 | Rau | Apr. 27, 1954 |